United States Patent
Yamaguchi

(10) Patent No.: US 6,636,638 B1
(45) Date of Patent: Oct. 21, 2003

(54) EQUIPMENT CONTROL METHOD AND EQUIPMENT CONTROL SYSTEM

(75) Inventor: Takashi Yamaguchi, Kanagawa-ken (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/407,991

(22) Filed: Sep. 29, 1999

(30) Foreign Application Priority Data

Nov. 18, 1998 (JP) ............................................ 10-328067

(51) Int. Cl.⁷ ................................................ G06K 9/36
(52) U.S. Cl. ...................................... 382/232; 382/166
(58) Field of Search .................................. 382/232, 318, 382/100, 166, 183, 240; 380/28; 235/494; 375/240.01, 245

(56) References Cited

U.S. PATENT DOCUMENTS

| | | | | |
|---|---|---|---|---|
| 4,639,778 A | * | 1/1987 | Yamaguchi et al. | 358/135 |
| 5,471,533 A | | 11/1995 | Wang et al. | 380/51 |
| 5,832,119 A | | 11/1998 | Rhoads | 382/232 |
| 5,901,224 A | * | 5/1999 | Hecht | 380/4 |
| 5,946,414 A | * | 8/1999 | Cass et al. | 382/183 |
| 5,949,055 A | * | 9/1999 | Fleet et al. | 235/469 |
| 6,031,914 A | * | 2/2000 | Tewfik et al. | 380/54 |
| 6,055,321 A | * | 4/2000 | Numao et al. | 382/100 |
| 6,094,483 A | * | 7/2000 | Fridrich et al. | 380/28 |
| 6,219,073 B1 | * | 4/2001 | Suzuoki | 345/526 |
| 6,332,030 B1 | * | 12/2001 | Manjunath et al. | 382/100 |
| 6,363,159 B1 | * | 3/2002 | Rhoads | 382/100 |

FOREIGN PATENT DOCUMENTS

| | | | | |
|---|---|---|---|---|
| EP | 0 554 115 A | | 8/1993 | H04N/1/00 |
| JP | 09248935 A | * | 9/1997 | B41J/2/44 |

OTHER PUBLICATIONS

Tanaka, et al; "Embedding Secret Information into a Dithered Multi–level Image"; Dept. of Computer Science, Nat'l Def. Academy; 1990; pp. 0216–0220.

* cited by examiner

Primary Examiner—Anh Hong Do
(74) Attorney, Agent, or Firm—Pillsbury Winthrop LLP

(57) ABSTRACT

An apparatus control method forms hidden image information comprising hidden information related to control instruction of a controlled apparatus and forms composite image information by embedding the formed hidden image information in the invisible state against the main image information. The formed composite image information is recorded on a recording medium and the composite image information is read from the recording medium that records the composite image information. The hidden information is restored by extracting hidden image information from the read composite image information and control instruction is decoded from the restored hidden information and a controlled apparatus is controlled by executing the decoded control instruction.

15 Claims, 15 Drawing Sheets

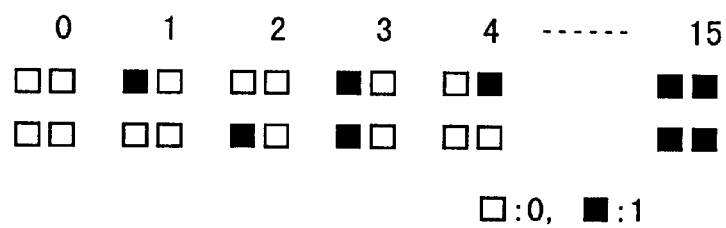
FIG. 4
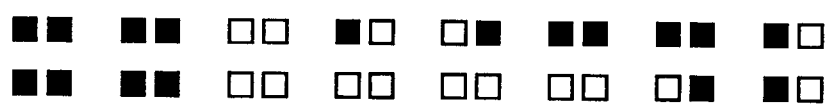
FIG. 5
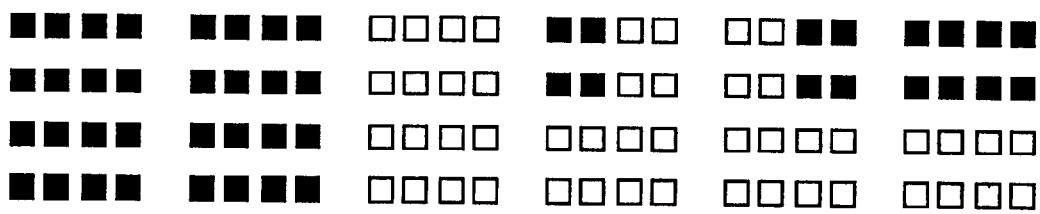
IN THE CASE OF n = 2
FI. 6

|   | MASK IMAGE | | | | | | | | | | | | | | | |
|---|---|---|---|---|---|---|---|---|---|---|---|---|---|---|---|---|
|   | 0 | 1 | 2 | 3 | 4 | 5 | 6 | 7 | 8 | 9 | 10 | 11 | 12 | 13 | 14 | 15 |
| 0 | 0 | 1 | 0 | 0 | 1 | 1 | 0 | 0 | 1 | 1 | 0 | 0 | 1 | 1 | 0 | 0 |
| 1 | 1 | 0 | 1 | 1 | 0 | 0 | 1 | 1 | 0 | 0 | 1 | 1 | 0 | 0 | 1 | 1 |
| 2 | 0 | 1 | 0 | 0 | 1 | 1 | 0 | 0 | 1 | 1 | 0 | 0 | 1 | 1 | 0 | 0 |
| 3 | 1 | 0 | 1 | 1 | 0 | 0 | 1 | 1 | 0 | 0 | 1 | 1 | 0 | 0 | 1 | 1 |
| 4 | 0 | 1 | 0 | 0 | 1 | 1 | 0 | 0 | 1 | 1 | 0 | 0 | 1 | 1 | 0 | 0 |
| 5 | 1 | 0 | 1 | 1 | 0 | 0 | 1 | 1 | 0 | 0 | 1 | 1 | 0 | 0 | 1 | 1 |
| 6 | 0 | 1 | 0 | 0 | 1 | 1 | 0 | 0 | 1 | 1 | 0 | 0 | 1 | 1 | 0 | 0 |
| 7 | 1 | 0 | 1 | 1 | 0 | 0 | 1 | 1 | 0 | 0 | 1 | 1 | 0 | 0 | 1 | 1 |
| 8 | 0 | 1 | 0 | 0 | 1 | 1 | 0 | 0 | 1 | 1 | 0 | 0 | 1 | 1 | 0 | 0 |
| 9 | 1 | 0 | 1 | 1 | 0 | 0 | 1 | 1 | 0 | 0 | 1 | 1 | 0 | 0 | 1 | 1 |
| 10 | 0 | 1 | 0 | 0 | 1 | 1 | 0 | 0 | 1 | 1 | 0 | 0 | 1 | 1 | 0 | 0 |
| 11 | 1 | 0 | 1 | 1 | 0 | 0 | 1 | 1 | 0 | 0 | 1 | 1 | 0 | 0 | 1 | 1 |

FIG. 8

HIDDEN IMAGE

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 0 | 0 | 0 | 0 | 0 | 0 | 0 | 0 | 0 | 0 | 0 | 0 | 0 | 0 | 0 | 0 |
| 1 | 0 | 0 | 0 | 0 | 0 | 0 | 0 | 0 | 0 | 0 | 0 | 0 | 0 | 0 | 0 | 0 |
| 2 | 0 | 0 | 0 | 1 | 1 | 1 | 1 | 0 | 0 | 0 | 0 | 1 | 1 | 1 | 0 | 0 |
| 3 | 0 | 0 | 0 | 1 | 1 | 1 | 1 | 0 | 0 | 0 | 0 | 1 | 1 | 1 | 0 | 0 |
| 4 | 0 | 0 | 0 | 1 | 1 | 1 | 1 | 0 | 0 | 0 | 0 | 1 | 1 | 1 | 0 | 0 |
| 5 | 0 | 0 | 0 | 1 | 1 | 1 | 1 | 0 | 0 | 0 | 0 | 1 | 1 | 1 | 0 | 0 |
| 6 | 0 | 0 | 0 | 0 | 0 | 0 | 1 | 1 | 1 | 1 | 1 | 1 | 1 | 1 | 0 | 0 |
| 7 | 0 | 0 | 0 | 0 | 0 | 0 | 1 | 1 | 1 | 1 | 1 | 1 | 1 | 1 | 0 | 0 |
| 8 | 0 | 0 | 0 | 0 | 0 | 0 | 1 | 1 | 1 | 1 | 1 | 1 | 1 | 1 | 0 | 0 |
| 9 | 0 | 0 | 0 | 0 | 0 | 0 | 1 | 1 | 1 | 1 | 1 | 1 | 1 | 1 | 0 | 0 |
| 10 | 0 | 0 | 0 | 0 | 0 | 0 | 0 | 0 | 0 | 0 | 0 | 0 | 0 | 0 | 0 | 0 |
| 11 | 0 | 0 | 0 | 0 | 0 | 0 | 0 | 0 | 0 | 0 | 0 | 0 | 0 | 0 | 0 | 0 |

FIG. 9

RESULTS OF SMOOTHING PROCESS

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | x | x | x | x | x | x | x | x | x | x | x | x | x | x | x | x |
| 1 | x | 0 | 0 | 0 | 0 | 0 | 0 | 0 | 0 | 0 | 0 | 0 | 0 | 0 | 0 | x |
| 2 | x | 0.25 | 0.75 | 1 | 1 | 0.75 | 0.25 | 0 | 0 | 0.25 | 0.75 | 1 | 1 | 0.75 | 0.25 | x |
| 3 | x | 0.25 | 0.75 | 1 | 1 | 0.75 | 0.25 | 0 | 0 | 0.25 | 0.75 | 1 | 1 | 0.75 | 0.25 | x |
| 4 | x | 0.25 | 0.75 | 1 | 1 | 0.75 | 0.25 | 0 | 0 | 0.25 | 0.75 | 1 | 1 | 0.75 | 0.25 | x |
| 5 | x | 0.25 | 0.75 | 1 | 1 | 0.75 | 0.25 | 0 | 0 | 0.25 | 0.75 | 1 | 1 | 0.75 | 0.25 | x |
| 6 | x | 0 | 0 | 0 | 0 | 0.25 | 0.75 | 1 | 1 | 1 | 1 | 1 | 1 | 0.75 | 0.25 | x |
| 7 | x | 0 | 0 | 0 | 0 | 0.25 | 0.75 | 1 | 1 | 1 | 1 | 1 | 1 | 0.75 | 0.25 | x |
| 8 | x | 0 | 0 | 0 | 0 | 0.25 | 0.75 | 1 | 1 | 1 | 1 | 1 | 1 | 0.75 | 0.25 | x |
| 9 | x | 0 | 0 | 0 | 0 | 0.25 | 0.75 | 1 | 1 | 1 | 1 | 1 | 1 | 0.75 | 0.25 | x |
| 10 | x | 0 | 0 | 0 | 0 | 0 | 0 | 0 | 0 | 0 | 0 | 0 | 0 | 0 | 0 | x |
| 11 | x | 0 | 0 | 0 | 0 | 0 | 0 | 0 | 0 | 0 | 0 | 0 | 0 | 0 | 0 | x |

FIG. 10

RESULTS OF PHASE MODULATION

|   | 0 | 1 | 2 | 3 | 4 | 5 | 6 | 7 | 8 | 9 | 10 | 11 | 12 | 13 | 14 | 15 |
|---|---|---|---|---|---|---|---|---|---|---|----|----|----|----|----|----|
| 0 | 0 | 1 | 0 | 0 | 0 | 1 | 0 | 0 | 1 | 1 | 0 | 0 | 1 | 1 | 0 | 0 |
| 1 | 1 | 1 | 1 | 1 | 1 | 0 | 1 | 1 | 0 | 0 | 1 | 1 | 0 | 0 | 1 | 1 |
| 2 | 0 | 0 | 0 | 1 | 0 | 0 | 0 | 0 | 1 | 1 | 0 | 0 | 0 | 0 | 0 | 0 |
| 3 | 1 | 1 | 1 | 0 | 1 | 1 | 1 | 1 | 0 | 0 | 1 | 1 | 1 | 1 | 1 | 1 |
| 4 | 0 | 0 | 0 | 1 | 0 | 0 | 0 | 0 | 1 | 1 | 0 | 0 | 0 | 0 | 0 | 0 |
| 5 | 1 | 1 | 1 | 0 | 1 | 1 | 1 | 1 | 0 | 1 | 1 | 1 | 1 | 1 | 1 | 1 |
| 6 | 0 | 0 | 0 | 0 | 1 | 1 | 0 | 1 | 0 | 0 | 1 | 1 | 0 | 0 | 0 | 0 |
| 7 | 1 | 1 | 1 | 1 | 0 | 0 | 1 | 0 | 1 | 1 | 0 | 1 | 1 | 1 | 1 | 1 |
| 8 | 0 | 0 | 0 | 0 | 1 | 1 | 0 | 0 | 1 | 0 | 1 | 0 | 0 | 1 | 0 | 0 |
| 9 | 1 | 1 | 1 | 1 | 0 | 0 | 1 | 1 | 0 | 1 | 0 | 1 | 1 | 0 | 1 | 1 |
| 10 | 0 | 0 | 0 | 0 | 1 | 1 | 0 | 0 | 1 | 1 | 0 | 0 | 0 | 1 | 0 | 0 |
| 11 | 1 | 1 | 1 | 1 | 0 | 0 | 1 | 1 | 0 | 0 | 1 | 1 | 0 | 0 | 1 | 1 |

FIG. 11

RESULTS OF COLOR DIFFERENCE MODULATION   RED COMPONENT

|    | 0   | 1   | 2   | 3   | 4   | 5   | 6   | 7   | 8   | 9   | 10  | 11  | 12  | 13  | 14  | 15  |
|----|-----|-----|-----|-----|-----|-----|-----|-----|-----|-----|-----|-----|-----|-----|-----|-----|
| 0  | -48 | -48 | +48 | +48 | -48 | -48 | +48 | +48 | -48 | -48 | +48 | +48 | -48 | -48 | +48 | +48 |
| 1  | +48 | +48 | -48 | -48 | +48 | +48 | -48 | -48 | +48 | +48 | -48 | -48 | +48 | +48 | -48 | -48 |
| 2  | -48 | +48 | +48 | -48 | +48 | +48 | +48 | +48 | -48 | +48 | +48 | -48 | +48 | +48 | +48 | +48 |
| 3  | +48 | -48 | -48 | +48 | -48 | -48 | -48 | -48 | +48 | -48 | -48 | +48 | -48 | -48 | -48 | -48 |
| 4  | -48 | +48 | +48 | -48 | +48 | +48 | +48 | +48 | -48 | +48 | +48 | -48 | +48 | +48 | +48 | +48 |
| 5  | +48 | -48 | -48 | +48 | -48 | -48 | -48 | -48 | +48 | -48 | -48 | +48 | -48 | -48 | -48 | -48 |
| 6  | -48 | +48 | +48 | +48 | -48 | +48 | +48 | +48 | -48 | -48 | -48 | +48 | -48 | +48 | +48 | +48 |
| 7  | +48 | -48 | -48 | -48 | +48 | -48 | -48 | -48 | +48 | +48 | +48 | -48 | +48 | -48 | -48 | -48 |
| 8  | -48 | +48 | +48 | +48 | -48 | +48 | -48 | +48 | -48 | -48 | +48 | -48 | -48 | +48 | +48 | +48 |
| 9  | +48 | -48 | -48 | -48 | +48 | -48 | +48 | -48 | +48 | +48 | -48 | +48 | +48 | -48 | -48 | -48 |
| 10 | -48 | +48 | +48 | +48 | -48 | -48 | -48 | +48 | -48 | -48 | +48 | +48 | -48 | -48 | +48 | +48 |
| 11 | +48 | -48 | -48 | -48 | +48 | +48 | +48 | -48 | +48 | +48 | -48 | -48 | +48 | +48 | -48 | -48 |

FIG. 12

RESULTS OF SUPERIMPOSITION PROCESS   RED COMPONENT

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 79 | 79 | 175 | 175 | 79 | 79 | 175 | 175 | 79 | 79 | 175 | 175 | 79 | 79 | 175 | 175 |
| 1 | 175 | 175 | 79 | 79 | 175 | 175 | 79 | 79 | 175 | 175 | 79 | 79 | 175 | 175 | 79 | 79 |
| 2 | 79 | 175 | 175 | 79 | 175 | 175 | 175 | 175 | 79 | 175 | 175 | 79 | 175 | 175 | 175 | 175 |
| 3 | 175 | 79 | 79 | 175 | 79 | 79 | 79 | 79 | 175 | 79 | 79 | 175 | 79 | 79 | 79 | 79 |
| 4 | 79 | 175 | 175 | 79 | 175 | 175 | 79 | 175 | 79 | 175 | 175 | 175 | 175 | 175 | 175 | 175 |
| 5 | 175 | 79 | 79 | 175 | 79 | 79 | 175 | 79 | 175 | 79 | 79 | 79 | 79 | 79 | 79 | 79 |
| 6 | 79 | 79 | 175 | 175 | 79 | 79 | 175 | 175 | 79 | 175 | 175 | 175 | 175 | 175 | 175 | 175 |
| 7 | 175 | 175 | 79 | 79 | 175 | 175 | 79 | 79 | 175 | 79 | 79 | 79 | 79 | 79 | 79 | 79 |
| 8 | 79 | 79 | 175 | 175 | 79 | 79 | 175 | 175 | 175 | 175 | 175 | 175 | 175 | 175 | 175 | 175 |
| 9 | 175 | 175 | 79 | 79 | 175 | 175 | 79 | 79 | 79 | 79 | 79 | 79 | 79 | 79 | 79 | 79 |
| 10 | 79 | 79 | 175 | 175 | 79 | 79 | 175 | 175 | 175 | 175 | 175 | 175 | 175 | 175 | 175 | 175 |
| 11 | 175 | 175 | 79 | 79 | 175 | 175 | 79 | 79 | 79 | 79 | 79 | 175 | 79 | 175 | 175 | 79 |

RESULTS OF RECOVERY (a) RED COMPONENT

| | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| 0 | 79 | 175 | 175 | 175 | 79 | 79 | 175 | 175 | 79 | 79 | 175 | 175 | 79 | 79 | 175 | 175 |
| 1 | 175 | 79 | 79 | 79 | 175 | 175 | 79 | 79 | 175 | 175 | 79 | 79 | 175 | 175 | 79 | 79 |
| 2 | 79 | 175 | 175 | 175 | 175 | 175 | 175 | 175 | 175 | 175 | 175 | 79 | 175 | 175 | 175 | 79 |
| 3 | 175 | 79 | 79 | 79 | 79 | 79 | 79 | 79 | 79 | 79 | 79 | 175 | 79 | 79 | 79 | 175 |
| 4 | 79 | 175 | 175 | 175 | 175 | 175 | 175 | 79 | 175 | 175 | 175 | 79 | 175 | 175 | 175 | 79 |
| 5 | 175 | 79 | 79 | 79 | 79 | 79 | 79 | 175 | 79 | 79 | 79 | 175 | 79 | 79 | 79 | 175 |
| 6 | 79 | 175 | 175 | 175 | 79 | 175 | 175 | 175 | 175 | 175 | 175 | 175 | 175 | 175 | 175 | 79 |
| 7 | 175 | 79 | 79 | 79 | 175 | 79 | 79 | 79 | 79 | 79 | 79 | 79 | 79 | 79 | 79 | 175 |
| 8 | 79 | 175 | 175 | 175 | 79 | 175 | 175 | 175 | 175 | 175 | 175 | 175 | 175 | 175 | 175 | 79 |
| 9 | 175 | 79 | 79 | 79 | 175 | 79 | 79 | 79 | 79 | 79 | 79 | 79 | 79 | 79 | 79 | 175 |
| 10 | 79 | 175 | 175 | 175 | 79 | 175 | 175 | 175 | 79 | 175 | 175 | 175 | 79 | 175 | 175 | 79 |
| 11 | 175 | 79 | 79 | 79 | 175 | 79 | 79 | 79 | 175 | 79 | 79 | 79 | 175 | 79 | 79 | 175 |

RESULTS OF THINNING PROCESS   RED COMPONENT

|    | 0  | 1 | 2 | 3 | 4   | 5 | 6 | 7 | 8   | 9 | 10 | 11 | 12  | 13 | 14 | 15 |
|----|----|---|---|---|-----|---|---|---|-----|---|----|----|-----|----|----|----|
| 0  | 79 |   |   |   | 79  |   |   |   | 79  |   |    |    | 79  |    |    |    |
| 1  |    |   |   |   |     |   |   |   |     |   |    |    |     |    |    |    |
| 2  |    |   |   |   | 175 |   |   |   | 79  |   |    |    | 175 |    |    |    |
| 3  |    |   |   |   |     |   |   |   |     |   |    |    |     |    |    |    |
| 4  | 79 |   |   |   |     |   |   |   | 175 |   |    |    | 175 |    |    |    |
| 5  |    |   |   |   |     |   |   |   |     |   |    |    |     |    |    |    |
| 6  |    |   |   |   |     |   |   |   |     |   |    |    |     |    |    |    |
| 7  |    |   |   |   |     |   |   |   |     |   |    |    |     |    |    |    |
| 8  | 79 |   |   |   | 79  |   |   |   |     |   |    |    |     |    |    |    |
| 9  |    |   |   |   |     |   |   |   |     |   |    |    |     |    |    |    |
| 10 |    |   |   |   |     |   |   |   |     |   |    |    |     |    |    |    |
| 11 |    |   |   |   |     |   |   |   |     |   |    |    |     |    |    |    |

RESULTS OF INTERPOLATING PROCESS   RED COMPONENT

|    | 0  | 1  | 2  | 3  | 4   | 5   | 6   | 7   | 8   | 9   | 10  | 11  | 12  | 13  | 14  | 15  |
|----|----|----|----|----|-----|-----|-----|-----|-----|-----|-----|-----|-----|-----|-----|-----|
| 0  | 79 | 79 | 79 | 79 | 79  | 79  | 79  | 79  | 79  | 79  | 79  | 79  | 79  | 79  | 79  | 79  |
| 1  | 79 | 79 | 79 | 79 | 79  | 79  | 79  | 79  | 79  | 79  | 79  | 79  | 79  | 79  | 79  | 79  |
| 2  | 79 | 79 | 79 | 79 | 79  | 79  | 79  | 79  | 79  | 79  | 79  | 79  | 79  | 79  | 79  | 79  |
| 3  | 79 | 79 | 79 | 79 | 79  | 79  | 79  | 79  | 79  | 79  | 79  | 79  | 79  | 79  | 79  | 79  |
| 4  | 79 | 79 | 79 | 79 | 79  | 79  | 79  | 79  | 79  | 79  | 79  | 79  | 79  | 79  | 79  | 79  |
| 5  | 79 | 79 | 79 | 79 | 175 | 175 | 175 | 175 | 79  | 79  | 79  | 79  | 79  | 79  | 79  | 175 |
| 6  | 79 | 79 | 79 | 79 | 175 | 175 | 175 | 175 | 79  | 79  | 79  | 79  | 175 | 175 | 175 | 175 |
| 7  | 79 | 79 | 79 | 79 | 175 | 175 | 175 | 175 | 175 | 175 | 175 | 175 | 175 | 175 | 175 | 175 |
| 8  | 79 | 79 | 79 | 79 | 79  | 79  | 79  | 79  | 175 | 175 | 175 | 175 | 175 | 175 | 175 | 175 |
| 9  | 79 | 79 | 79 | 79 | 79  | 79  | 79  | 79  | 175 | 175 | 175 | 175 | 175 | 175 | 175 | 175 |
| 10 | 79 | 79 | 79 | 79 | 79  | 79  | 79  | 79  | 175 | 175 | 175 | 175 | 175 | 175 | 175 | 175 |
| 11 | 79 | 79 | 79 | 79 | 79  | 79  | 79  | 79  | 175 | 175 | 175 | 175 | 175 | 175 | 175 | 175 |

EQUIPMENT CONTROL METHOD AND EQUIPMENT CONTROL SYSTEM

BACKGROUND OF THE INVENTION

1. Field of the Invention

The present invention relates to an apparatus control method using image information recorded especially on a paper recording medium as a man-machine interface and an apparatus control system using this method.

2. Description of the Related Art

Household electric apparatus such as video decks and information apparatus such as personal computers have rapidly become widely used in recent years. However, it is very difficult to operate these apparatus for children, old persons or handicapped persons and a method to operate the apparatus control more easily is desired.

Two-dimensional code printed sheets of paper have been used recently to control apparatus. That is, a technology to regenerate voices by scanning two-dimensional codes with a scanner has been developed.

However, in this method using paper media, the printing and design of surfaces of paper media are restricted because two-dimensional code printed paper media are used.

Further, an exclusive use manufacturing apparatus is needed for a technology to unify paper and an exclusive use remote control device.

SUMMARY OF THE INVENTION

It is an object of the present invention to provide an easy-to-operate method and system for controlling apparatus with less restriction of design of recording media and requiring no exclusive use manufacturing apparatus.

The present invention provides a method comprising the steps of reading composite image information comprising main image information and hidden image information included in the main image information in the hardly visible state, the hidden image information comprising hidden information related to control instruction of a controlled apparatus, and the composite image being recorded on a recording medium; restoring the hidden information by extracting the hidden image information from the read composite image information; decoding the control instruction from the restored hidden information; and controlling the controlled apparatus by executing the decoded control instruction.

Further, the present invention provides a system comprising means for reading composite image information from a recording medium that recorded the composite image information formed by embedding hidden image information comprising hidden information related to a control instruction of a controlled apparatus in main image information in the hardly visible state; means for restoring the hidden information by extracting the embedded hidden image information from the composite image information read by the reading means; means for decoding the control instruction restored by the restoring means; and means for controlling the controlled apparatus by executing the control instruction decoded by the decoding means.

BRIEF DESCRIPTION OF THE DRAWINGS

FIG. 4 is a diagram for explaining the binary image processing using two-dimensional codes of hidden image information;

FIG. 5 is a diagram for explaining the binary image processing using two-dimensional codes of hidden image information;

FIG. 6 is a diagram for explaining the binary image processing using two-dimensional codes of hidden image information;

FIG. 8 is a diagram showing a definite example of computation in forming composite image information;

FIG. 9 is a diagram showing a definite example of computation in forming composite image information;

FIG. 10 is a diagram showing a definite example of computation in forming composite image information;

FIG. 11 is a diagram showing a definite example of computation in forming composite image information;

FIG. 12 is a diagram showing a definite example of computation in forming composite image information;

FIG. 13 is a diagram showing a definite example of computation in forming composite image information;

FIG. 14 is a diagram showing a definite example of computation in forming composite image information;

FIG. 15 is a diagram showing a definite example of computation in forming composite image information;

FIG. 16 is a diagram for explaining the thinning processing in a third regeneration method; and FIG. 17 is a diagram for explaining an interpolating process in a third regeneration method.

DETAILED DESCRIPTION OF THE PREFERRED EMBODIMENTS

Preferred embodiments of the present invention will be described below referring to the attached drawings.

Figure 1:
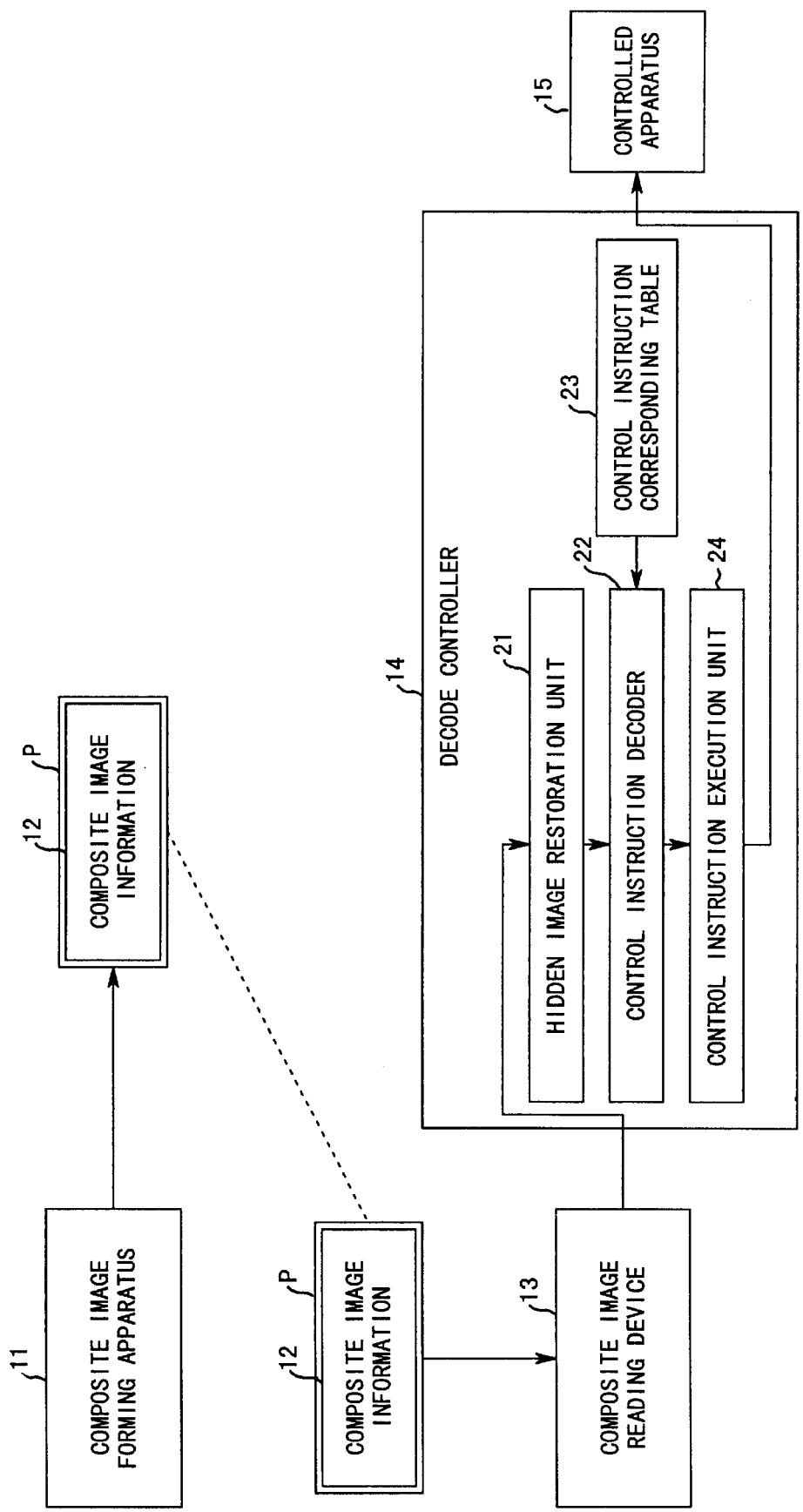
FIG. 1 is a block diagram showing the construction of an apparatus control system of the present invention.

In FIG. 1, a composite image forming device 11 forms composite image information 12 in advance using a composite image forming method that is described later in detail and records that information 12 on a sheet P as a recording medium. A composite image reading device 13 reads the composite image information 12 recorded on the sheet P through an optical scanning and sends the read result to a decode controller 14.

The decode controller 14 is composed of a hidden image restoration unit 21, a control instruction decoder 22, a control instruction corresponding table 23 and a control instruction execution unit 24. That is, first, the hidden image restoration unit 21 restores hidden image information by extracting hidden image information that is hidden in the composite image information 12 in the invisible state based on the read result from the composite image reading device 13.

Then, the control instruction decoder 22 collates the hidden image information restored by the hidden image restoration unit 21 with data in the control instruction corresponding table 23 and converts the hidden image information into a corresponding image information. That is, a corresponding instruction is decoded from the restored hidden image information. The control instruction execution unit 24 controls a controlled apparatus 15 by sending an actual control instruction thereto according to the decoded control instruction.

Figure 2:
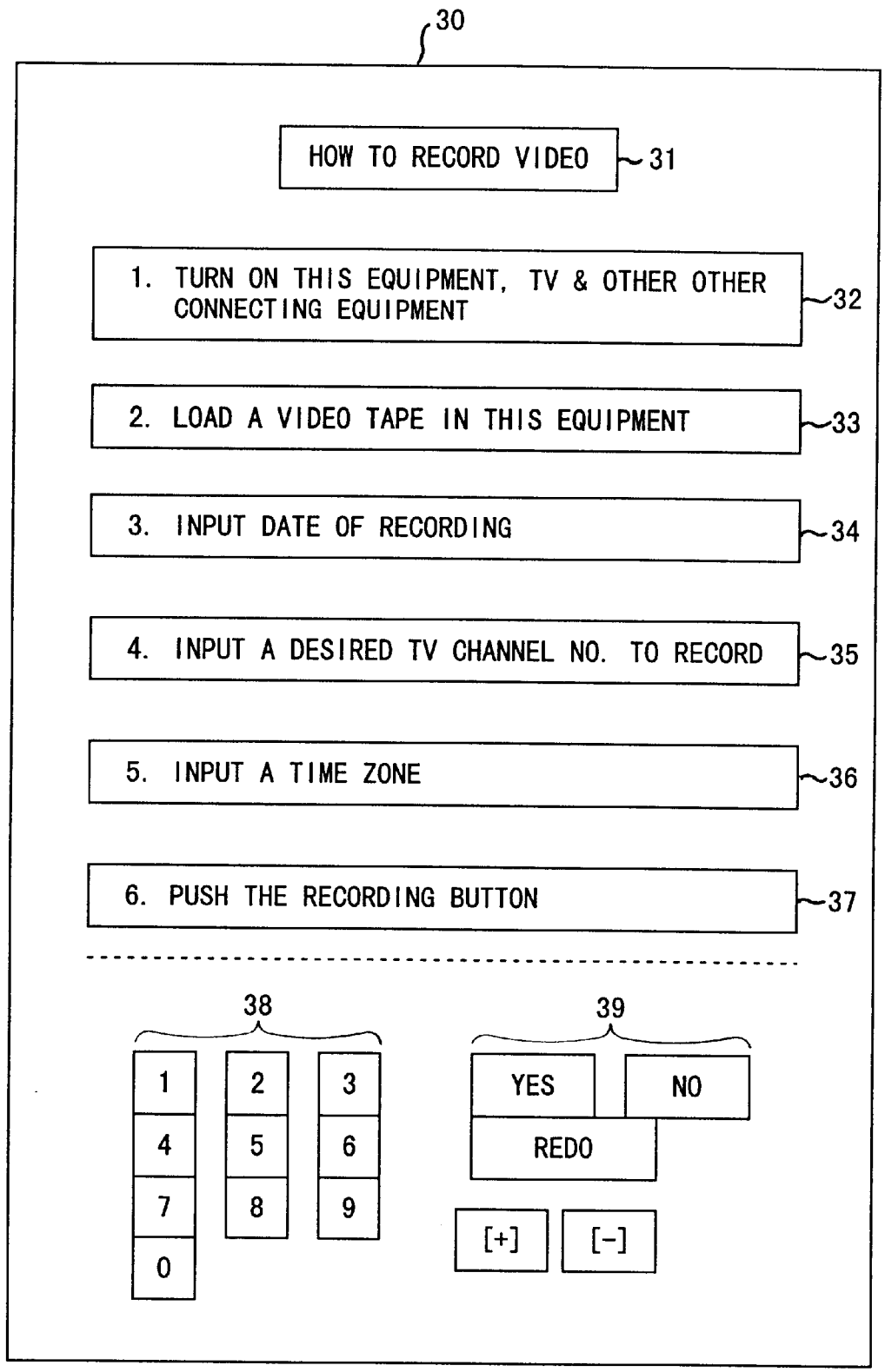
FIG. 2 is a diagram showing one example of the description of a video deck instruction manual regarding how to record video.

Here, an example of the method of the present invention when applied to the video deck recording control is explained. FIG. 2 is an example of the description of a general video deck instruction manual 30 regarding the video recording method. Generally, the instruction manual 30 contains the explanations "1–6" and illustrations supporting thereof (not shown) as shown in FIG. 2. But, how to operate a video deck is still hard to understand in many cases.

Using the method of the present invention, control codes corresponding to the text of the instruction manual 30 are hidden in the points shown by Codes 31–39 in advance of printing and binding the instruction manual 30.

Basically, a video deck user is able to easily control a controlled apparatus 15 (in this example, a video deck) by following the text of the instruction manual in order using a pen type composite image reading device 13.

In the example shown in FIG. 2, control codes that are able to directly control the controlled apparatus 15 are hidden at the portions shown by reference numerals 31, 32 and 34–39. In case of the portion shown by reference numeral 33 that is not able to directly control the controlled apparatus, a message, for instance, to urge the operation is displayed on the display of the controlled apparatus.

Thus, by selectively using hidden information, it is possible to directly operate an apparatus or urge the operation of a user. Therefore, the control system of the present invention is not restricted to a video deck but also can be applied to every apparatus requiring a man-to-machine interface.

Further, in FIG. 1, the composite image reading device 13 and the decode controller 14 are unified in one unit. However, when each of them is put in a separate case, it is possible to increase the degree of freedom of the system. For instance, in a video deck system, it is possible to use a pen type scanner as the composite image reading device 13, with a built-in decode controller 14 in the main body of the video deck, and exchange a wireless signal such as an infrared ray communication between the composite image reading device 13 and the decode controller 14. Thus, it becomes possible to control an apparatus remotely.

Next, the hidden image information forming method will be explained further in detail using FIG. 3.

First, in Step 41, a control instruction code of the controlled apparatus 15 is used as hidden information 40. Further, when a control instruction is composed of analog data, the control instruction is converted into digital data by A/D conversion. Then, the layout is made based on the relation of the hidden information 40 and main image information at the hidden side. For instance, in the video deck instruction manual 30 shown in FIG. 2, allocate a header of hidden information to Part 31 of "How To Record Video" and allocate actual control instruction codes to Part 32 of "1. This apparatus, TV, etc . . . " and so on.

Correlation between the image information becomes a guide when a user extracts specific information from multiple hidden information from composite image information.

For instance, when applying the present invention to an electronic picture book, it is assumed to use a landscape photograph of a zoo as main image information to correlate with hidden image information. For instance, regarding photographs of a zoo, for a photograph of a lion, for example, correlate the roaring of a lion with the photograph of the lion. For a photograph of penguins, correlate information on the mode of life of penguins with the photograph of penguins. That is, correlate information so as to easily associate main image information with hidden image information. Thus, it becomes easy to find desired hidden image information from multiple main image information.

Further, when the present invention is applied to ID cards, for main image information, a photograph of an ID card possessor's face is used and for hidden image information, the ID card possessor's personal information can be specified. For instance, a fingerprint image, voiceprint information, etc. is used and the voice print information is hidden in the mouth portion of a face photograph.

Next, in Step 42, a header of the hidden information 40 is formed. This is to describe a hidden location, a hidden quantity, type of hidden information and use when regenerating hidden image information in order to correlate hidden image information with main image information. An example of the hidden image information header is shown in Table 1, below.

TABLE 1

| Item | Symbol | Data Size |
| --- | --- | --- |
| Hidden header size | HdrSize | 4bytes |
| Number of hidden information | Stl 1nfoNum | 2bytes |
| Hidden information 1 position x, y | lEmbPosX, lEmbPosY | 4bytes, 4bytes |
| Hidden information 1 size x, y | lEmbSizeX, lEmbSizeY | 4bytes, 4bytes |
| Hidden information 1 type | lEmbType | 2bytes |
| Hidden information n position x, y | nEmbPosX, nEmbPosY | 4bytes, 4bytes |
| Hidden information n size x, y | nEmbSizeX, nEmbSizeY | 4bytes, 4bytes |
| Hidden information n type | nEmbType | 2bytes |

Here, for type of hidden information, what is hidden information 40 is described in terms of a value that is preset by a system.

Next, in Step 43, the hidden information 40 that was converted into digital data and the hidden information header are made into a binary image by two-dimensional codes. In this binary imaging, the hidden image information 40 is delimited in 4 bit blocks in order from the top and replaced with 2×2 pixel black and white binary image information according to a value of each block as shown in FIG. 4.

For instance, assuming that the hidden information 40 is arranged in the hexadecimal notation from the top as shown below,

FF 01 45 D3 . . .

They are placed as shown in FIG. 5.

Further, binary image information can be enlarged by n times so as not to destroy hidden image information in the smoothing step during the composite processing that is described below. Here, it is desirable that n=2–4. For instance, the result when a portion of the binary image information shown in FIG. 5 was enlarged at n=2 is shown in FIG. 6.

Further, in this embodiment Calra codes were applied to two-dimensional codes in the two-dimensional coding but other matrix system two-dimensional codes and two-dimensional bar codes such as Glyph codes are usable with no problem.

Thus, after completely replacing hidden image information with two-dimensional codes, in Step 44, based on information of the information header, the codes are laid out two-dimensionally and hidden image information 45 is obtained. In this example, as the hidden image information 45, a hidden information header a, a first hidden information b, a second hidden information c and a third hidden information d are converted.

Figure 7:
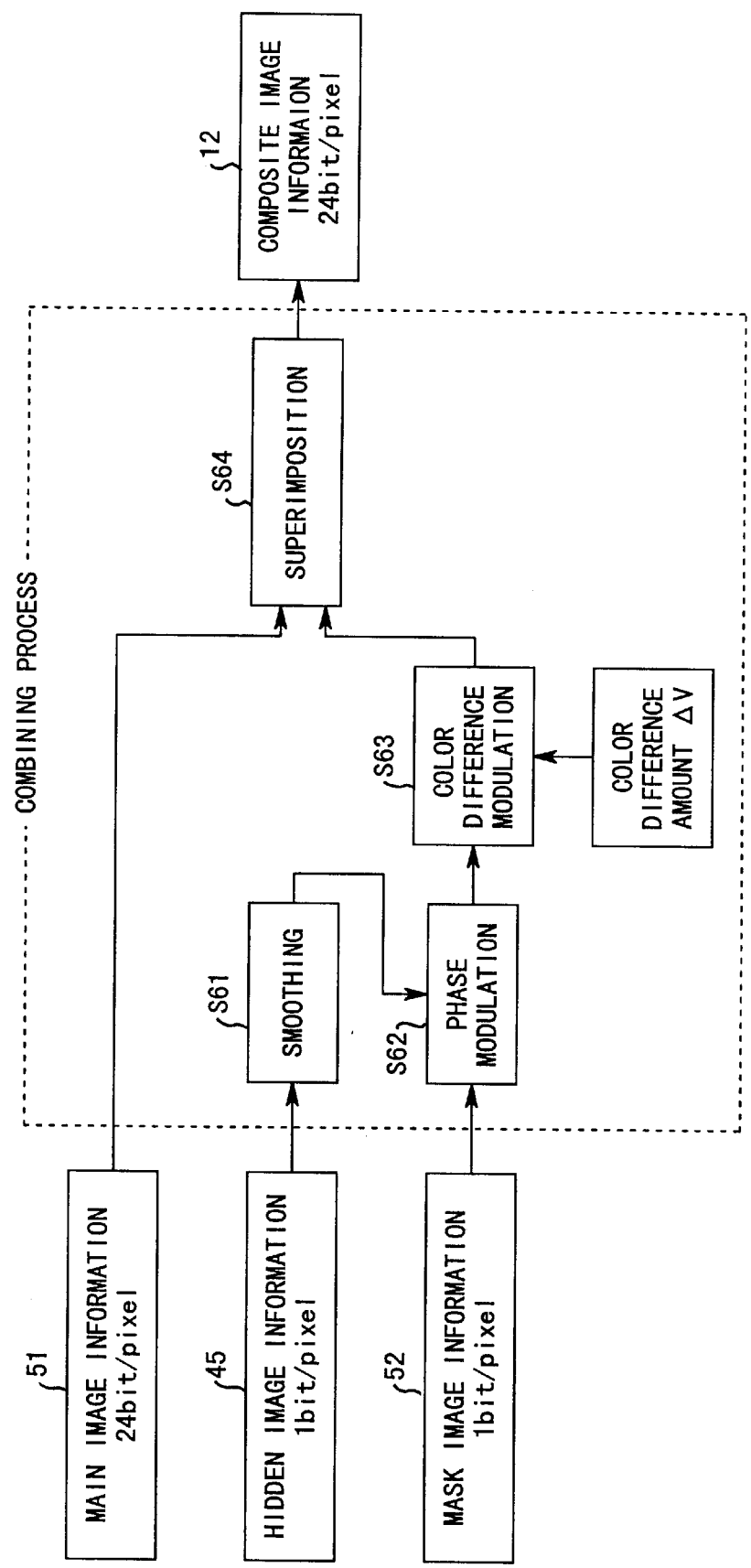
FIG. 7 is a diagram for explaining steps of preparation of composite image information.

Next, referring to FIG. 7, the composite image information forming step in the composite image forming apparatus 11 will be explained in detail.

The main image information 51 is the image information wherein the hidden information 40 is hidden, and is equivalent to, for instance, the text of the instruction manual shown in FIG. 2. This information has 24 bit (R, G, B each 8 bits) information per pixel.

Figure 3:
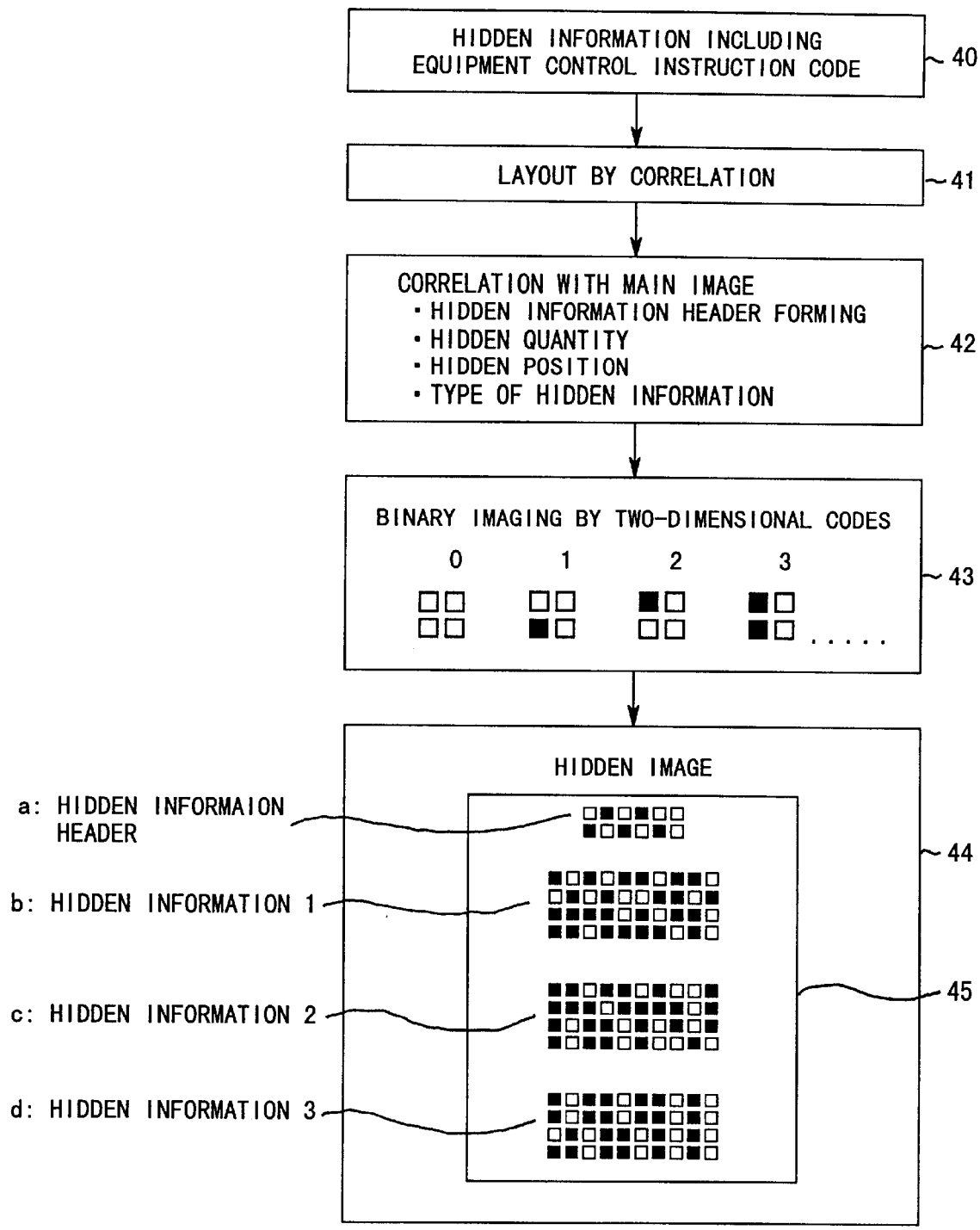
FIG. 3 is a diagram for explaining steps of forming hidden image information.

The hidden image information 45 is the hidden information 40 converted into a binary image according to the technique referred to in FIG. 3 and is equivalent to, for instance, an apparatus control instruction code. This binary image has 1 bit information per pixel.

Mask image information 52 is image information that is used in the composite processing and when restoring the hidden image information 45 and has 1 bit information per pixel.

First, in the smoothing step S61, the smoothing processing is carried out by assuming back pixels of the hidden image information 45 as "1" and white pixels as "0." Here, pixels in the x direction at both ends of noteworthy pixels are taken, a 3×1 pixel area is cut out and a weighted average is taken, as shown in the following expression (1).

$$W(i)=(STL(i-1)+2 \cdot STL(i)+STL(i+1))/4 \quad (1)$$

where, $W(i)$: a weighted average of $x=i$ pixel $STL(i)$: hidden image information of $x=i$ pixel=1 or 0

As mentioned above, unless binary image information is enlarged by n times when forming the hidden image information 45, the hidden image information 45 can be destroyed in this smoothing step. The greater the enlarging factor n of the hidden image information 45, the higher the safety factor of it not being destroyed, but data that are to be kept hidden tend to be exposed.

For instance, when the mask image information 52 is shown in FIG. 8 and the hidden image information 45 is shown in FIG. 9, the result of the smoothing process becomes as shown in FIG. 10. The hidden image information 45 is set at n=4 and it is enlarged by 4 times. Further, the hidden allowance, that is, as a portion that is not used as data, 2 pixels around the outside are set at "0."

Then, in the phase modulation step S62, based on the result of the smoothing process in the smoothing process step S61, the phase modulation of the mask image information 52 is executed according to the rules of the following expressions (2-1)–(2-3).

$$\text{When } W(i)=0,\ DES(i)=MSK(i) \quad (2\text{-}1)$$

$$\text{When } W(i)=1,\ DES(i)=MSK(i+2) \quad (2\text{-}2)$$

$$\text{When other than above,}\ DES(i)=MSK(i+1) \quad (2\text{-}3)$$

where, $DES(i)$: $x$=Phase modulation result of $i$ pixel=1 or 0

$MSK(i)$: $x$=Mask image information of $i$ pixel=1 or 0

Here, the x=0 column and x=15 column are the ends of the image information and the smoothing process and the phase modulation cannot be made. So, an exclusive OR of the mask image information 52 and the hidden image information 45 is taken at the end portions. Here, an example of the result of phase modulation is shown in FIG. 11.

Then, in the color difference modulation step S63, the color difference modulation is executed according to the rules of the following expressions (3-1)–(3-6) based on the result of the phase modulation in the phase modulation step S62. In this case, three components of R (Red), G (Green) and B (Blue) are calculated separately. Here, an example of the color modulation result of the red component is shown in FIG. 12.

When $DES(i)=1$:
$\quad VR(i)=-\Delta V \ldots (3\text{-}1)$
$\quad VG(i)=+\Delta V \ldots (3\text{-}2)$
$\quad VB(i)=+\Delta V \ldots (3\text{-}3)$ When $DES(i)=0$:
$\quad VR(i)=+\Delta V \ldots (3\text{-}4)$
$\quad VG(i)=-\Delta V \ldots (3\text{-}5)$
$\quad VB(i)=-\Delta V \ldots (3\text{-}6)$ $VR(i)$:
$\quad x=i$ pixel color difference modulation result for red component.
$\quad$ An integer in the range of from −255 to 255

$VG(i)$:
$\quad x=i$ pixel color difference modulation result for green component.
$\quad$ An integer in the range of from −255 to 255

$VB(i)$:
$\quad x=i$ pixel color difference modulation result for blue component.
$\quad$ An integer in the range of from −255 to 255

Further, the color difference amount $\Delta V$ is an integer within the preset range "0–255." The larger the color difference amount is, the higher the visible contrast becomes and the easier it is to regenerate and restore the hidden image information 45. However, when the color difference amount $\Delta V$ is made too large, the hidden information 40 tends to be easily exposed. Therefore, the color difference amount $\Delta V$ is desirable at about "16–96" and $\Delta V=48$ is used here.

Lastly, in the superimposition step S64, from the result of color difference modulation in the color difference modulation step S63 and the main image information 51, the composite image information 12 is formed by performing the superimposition shown by the following expressions (4-1)–(4-3).

$$DESR2(i)=DESR(i)+SRCR(i) \quad (4\text{-}1)$$

$$DESG2(i)=DESG(i)+SRCG(i) \quad (4\text{-}2)$$

$$DESB2(i)=DESB(i)+SRCB(i) \quad (4\text{-}3)$$

$DESR2(i)$:
$\quad x=i$ pixel superimposition result for red component.
$\quad$ An integer in the range of from 0 to 255

$DESG2(i)$:
$\quad x=i$ pixel superimposition result for green component.
$\quad$ An integer in the range of from 0 to 255

$DESB2(i)$:
$\quad x=i$ pixel superimposition result for blue component.
$\quad$ An integer in the range of from 0 to 255

$SRCR(i)$:
$\quad x=i$ pixel hidden image information for red component.
$\quad$ An integer in the range of from 0 to 255

$SRCG(i)$:

x=i pixel hidden image information for green component.

An integer in the range of from 0 to 255

SRCB(i):

x=i pixel hidden image information for blue component.

An integer in the range of from 0 to 255

Further, DESR2(i), DESG2(i) and DESB2(i) are integers in the range of "0–255" and therefore, when the result of calculation is below "0," it is set at "0" and above "255," set at "255."

The results for red component when all pixels of the main image information 51 are (R, G, B)=(127, 127, 127) are shown in FIG. 13. All values take integers within the range of "0–255" and "255" indicates that the red component is saturated. In FIG. 13, in the portions wherein (0, 0) pixel value=79, (1, 0) pixel value=79, (2, 0) pixel value=175 and so on, that is, the hidden image information 45 is not hidden, pixels with less red component and pixels with more red component are repeated in a unit of 2 pixels.

As shown in the expressions (3-1)–(3-3) or (3-4)–(3-6), color difference amount codes of red, green and blue are inverted. Therefore, in the pixels containing more red component, less of the green and blue components are contained, while in the pixels containing less red component, more of the other components are contained. Red (Red=255, Green=0, Blue=0) and Cyan (Red=0, Green=255, Blue=255) are complementary colors to each other and when red and cyan adjoin each other, they are hardly discriminated by the human eyes and appear to have no color. Because red color rich pixels and cyan color rich pixels are repetitively arranged in a unit of 2 pixels, these minute color differences are not discriminated by the human eyes and a color difference amount is judged to be ±0.

For instance, in the expression (4-1), the color difference is erroneously judged as follows:

$$DESR2(i) \approx SRCR(i) \quad (5)$$

and it becomes very difficult for the naked eye to distinguish that there is hidden image information. Therefore, it becomes possible to form the composite image information 12 with the hidden image information embedded in the main image information 51 in the invisible state according to this principle.

Next, a method to regenerate the hidden information 40 by restoring the hidden image information 45 from the composite image information 12 in the decoder controller 14 is described in detail.

The inside of the composite image information 12 optically read by the composite image reading device 13 is as shown in FIG. 13. To restore this composite image information, the mask image information 52 shown in FIG. 8 is used. By corresponding a value of the mask image information 52 and that of the composite image information 12 at 1:1, when the value of the mask image information 52 is "1," the composite image information 12 is judged to be valid and when the value of the mask image information 52 is "0," the composite image information 12 is judged to be invalid. The result of this judgement is shown in FIG. 14. In this figure, the hatched pixels are invalid data. Valid data (expressed in white) in FIG. 14 is cut out to a predetermined size.

In FIG. 9, n is set at 4 (n=4) and the hidden image information 45 is increased by 4 times and therefore, after eliminating the peripheral hidden allowance of 2 pixels, data is cut out in a unit of 4×4 pixels. If a valid data value in the range of 4×4 pixels is a red rich value ("175" in this embodiment), the hidden image information is 1 and if a cyan rich value ("179" in this embodiment), the hidden image information is 0. When both of red rich and cyan rich valid data are included, valid data more rich in red or cyan is adopted. This is because of the smoothing process in the composite processing.

Figure 15:
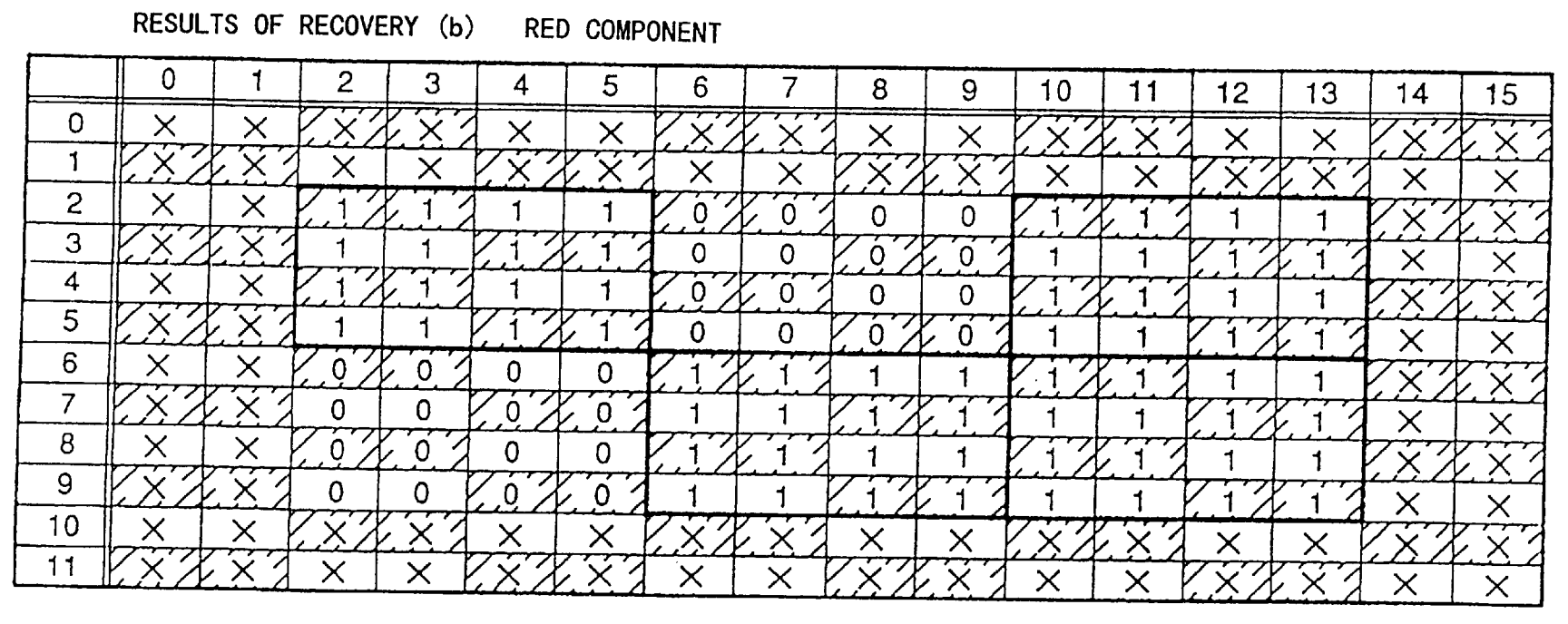

The result of the restored hidden image information 45 is shown in FIG. 15. The solid framed portion in the figure is the portion of the hidden image information 45, which agrees with FIG. 9 and it is seen that the information was completely restored. Further, by executing the steps in reverse, to form the hidden image information 45 shown in FIG. 3, it becomes possible to regenerate the hidden information 40.

Further, in this embodiment, the composite image information 12 was printed at the resolution of 400 dpi using a sublimation type thermal printer, read by an optical scanner at the resolution of 1200 dpi and then, restoration processed and it was possible to restore the image information with no problem.

As a second regeneration method, it is also possible to restore the hidden image information 45 by physically superimposing a regeneration sheet that has the transmission distribution factor in the same pattern as the mask image information 52 and prepared at the same recording resolution as that when recording the composite image information 12. This is because the balance of complementary colors of red and cyan makes the hidden image information invisible to the human eyes, however, when a regeneration sheet is superimposed on the composite image information, either red or cyan is hidden and both colors become out of balance, and unhidden red or cyan becomes visible. In this case, the restoration similarly becomes possible when the regeneration sheet is positioned on the contacting surface of the optical sensor portion of the composite image reading device 13 along with the composite image information 12.

As a third regenerating method, a system to thin values read by the composite image reading device 13 is described. That is, the composite image information read from a recording medium is thinned at a cycle corresponding to spacial frequency of predetermined pattern image information. Further, the spacial frequency expresses an amount indicating the spacial repetition. That is, it shows the number of sets of black and white stripes existing in a unit length or a unit field of vision. The red component of a value read by the composite image reading device 13 is as shown in FIG. 13. In this embodiment, the checkered pattern of a 4×2 unit is used in the composition processing and therefore, read values are thinned in a unit of 4 pixels. The enlarging factor n when forming a hidden image also relates to this value and the expression (Unit of checker-pattern×Enlarging factor n≧Number of thinned pixels) holds.

When the image data shown in FIG. 13 is thinned in a unit of 4 pixels, the result is as shown in FIG. 16. In this state, pixel data is insufficient and therefore, when all of the 4×2 areas are set at the same value with the remaining pixel at the top of a square area, the result becomes as shown in FIG. 17 and it is seen that the hidden image information 45 shown in FIG. 9 is restored at 100%, although shifted by 2 pixels in the x and y directions, respectively. Thus, when the read pixel information is thinned, the number of pixels to be processed in the restoration decreases and therefore, it becomes possible to restore information at a high speed.

Further, although FIG. 8 is used as the mask image information 52 and the laterally extended irregular checker-pattern of a 4×2 pixel unit are used in this embodiment, a 2×2 unit and a 8×2 unit can be used with no problem.

Further, in the above embodiment, a case when this system is applied to the recording control of a video deck is described. However, this system is not restricted to the video recording only but can be used as an interface of a control apparatus (for instance, personal computer, Auto Tellers Machine (ATM), etc.) which so far provide instructions on a display. When the present invention is used, those who so far felt a sense of incompatibility in the operation of a display are able to achieve the same operation using a paper medium to which the user is so far relatively accustomed.

Further, the present invention is also applicable to a POS system that is used in such service trade business as fast food shops, etc. When bar code information for managing prices, etc. is embedded in the invisible state in menu sheets attached with detailed explanations and/or photographs of goods instead of conventional bar codes, it becomes possible to get visual confirmation of customers and at the same time, to perform the POS work.

Composite image information can be printed using such relatively low cost recording medium as a sheet of paper and an ordinary color printer even when an operating system is changed. Therefore, it is possible to suppress overall costs and change contents in a short time.

As described above in detail, according to the present invention, it is possible to provide a new method and system with less restriction for design of recording medium, requiring no exclusive use manufacturing apparatus and extremely easy to operate for controlling apparatus.

What is claimed is:

1. An apparatus control method comprising:

performing a color difference modulation based on hidden image information including hidden information and mask image information which is set beforehand and necessary to restore the hidden information, the hidden information being related to a control instruction of a controlled apparatus;

forming composite image information by embedding a result of the color difference modulation in main image information to be in a hardly visible state;

reading the composite image information as formed and recorded on a recording medium;

restoring the hidden information by extracting the hidden image information from the read composite image information by using the mask image information;

decoding the control instruction from the restored hidden information; and controlling the controlled apparatus by executing the decoded control instruction.

2. An apparatus control method according to claim 1, wherein the hidden information comprising the hidden image information is composed of characters and images related to the control instruction of the controlled apparatus and is read by a scanner.

3. An apparatus control method comprising:

forming hidden image information comprising hidden information related to control instruction of a controlled apparatus;

performing a color difference modulation based on the hidden image information including the hidden information and mask image information which is set beforehand and necessary to restore the hidden information;

forming composite image information by embedding a result of the color difference modulation in main image information to be in a hardly visible state;

recording the composite image information on a recording medium;

reading the composite image information from the recording medium recording the composite image information;

restoring the hidden information by extracting the hidden image information from the read composite image information by using the mask image information;

decoding the control instruction from the restored hidden information; and controlling the controlled apparatus by executing the decoded control instruction.

4. An apparatus control method according to claim 3, wherein the hidden information comprising the hidden image information is composed of characters and images related to the control instruction of the controlled apparatus and is read by a scanner.

5. An apparatus control method according to claim 3, wherein the forming of the composite image information includes:

forming pattern modulated image information by modulating preset and predetermined pattern image information by the hidden image information; and superimposing the pattern modulated image information on the main image information.

6. An apparatus control method according to claim 3, wherein the forming of the composite image information includes:

executing the layout for embedding hidden image information in a specific position highly related to the hidden image information of the main image information.

7. An apparatus control method according to claim 5, wherein the restoring of the hidden information includes:

thinning the composite image information read from the recording medium at a cycle corresponding to the spacial frequency of the predetermined pattern image information; and extracting the hidden image information from the composite image information left as a result of the thinning.

8. An apparatus control system comprising:

means for performing a color difference modulation based on hidden image information including hidden information and mask image information which is set beforehand and necessary to restore the hidden information, the hidden information being related to a control instruction of a controlled apparatus;

means for forming composite image information by embedding a result of the color difference modulation in main image information to be in a hardly visible state;

means for recording the composite image information formed by the forming means on a recording medium;

means for reading the composite image information recorded by the recording means on the recording medium;

means for restoring the hidden information by extracting the embedded hidden image information from the composite image information, which is read from the recording medium, by using the mask image information;

means for decoding the control instruction restored by the restoring means; and means for controlling the controlled apparatus by executing the control instruction decoded by the decoding means.

9. An apparatus control system according to claim 8, wherein the hidden information comprising the hidden image information is composed of characters and images related to the control instruction of the controlled apparatus and is read by a scanner.

10. An apparatus control system comprising:

means for forming hidden image information comprising hidden information related to control instruction of a controlled apparatus;

means for performing a color difference modulation based on the hidden image information including the hidden information and mask image information which is set beforehand and necessary to restore the hidden information;

means for forming composite image information by embedding a result of the color difference modulation in main image information to be in a hardly visible state;

means for recording the composite image information formed by the composite image information forming means on a recording medium;

means for reading the composite image information from the recording medium that recorded composite image information by the recording means;

means for restoring the hidden information by extracting the hidden image information from the composite image information read by the reading means, wherein the restoring means uses the mask image information to extract the hidden image information from the composite image information;

means for decoding the control instruction from the hidden information restored by the restoring means; and means for controlling the controlled apparatus by executing the control instruction decoded by the decoding means.

11. An apparatus control system according to claim 10, wherein the hidden information comprising the hidden image information is composed of characters and images related to control instruction of the controlled apparatus and is read by a scanner.

12. An apparatus control system according to claim 10, wherein the composite image information forming means includes:

means for forming pattern modulated image information by modulating preset and predetermined pattern image information by the hidden image information; and means for superimposing the pattern modulated image information on the main image information.

13. An apparatus control system according to claim 10, wherein the composite image information forming means includes:

means for executing the layout for embedding the hidden image information in a specific position highly related to the hidden image information of the main image information.

14. An apparatus control system according to claim 12, wherein the restoring means includes:

means for thin the composite image information read from the recording medium at a cycle corresponding to the spacial frequency of the predetermined pattern image information; and means for extracting the hidden image information from the composite image information left as a result of the thinning by the thinning means.

15. An image processing method comprising:

performing a color difference modulation based on hidden image information including hidden information and mask image information which is set beforehand and necessary to restore the hidden information; and forming composite image information by embedding a result of the color difference modulation in main image information to be in a hardly visible state.

* * * * *